US010243460B2

(12) United States Patent
Babazadeh

(10) Patent No.: US 10,243,460 B2
(45) Date of Patent: Mar. 26, 2019

(54) METHOD AND APPARATUS FOR DYNAMIC VOLTAGE TRANSITION CONTROL IN SEMI-RESONANT AND RESONANT CONVERTERS

(71) Applicant: Infineon Technologies Austria AG, Villach (AT)

(72) Inventor: Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 87 days.

(21) Appl. No.: 15/445,437

(22) Filed: Feb. 28, 2017

(65) Prior Publication Data

US 2018/0248482 A1    Aug. 30, 2018

(51) Int. Cl.
*H02M 3/158*    (2006.01)
*H02M 3/156*    (2006.01)
*H02M 1/32*    (2007.01)
*H02M 1/08*    (2006.01)
*H02M 1/36*    (2007.01)
*H02M 1/00*    (2006.01)

(52) U.S. Cl.
CPC ........... *H02M 3/158* (2013.01); *H02M 3/156* (2013.01); *H02M 3/1584* (2013.01); *H02M 3/1588* (2013.01); *H02M 1/08* (2013.01); *H02M 1/32* (2013.01); *H02M 1/36* (2013.01); *H02M 2001/0025* (2013.01); *H02M 2001/0058* (2013.01)

(58) Field of Classification Search
CPC ........ H02M 1/084; H02M 3/158; H02M 1/08;
H02M 1/32; H02M 1/36; H02M
2001/0009; H02M 3/1584; H02M
2001/0025; H02M 3/156; H02M 3/1588
See application file for complete search history.

(56) References Cited

U.S. PATENT DOCUMENTS

| | | | |
|---|---|---|---|
| 9,110,480 B2 | 8/2015 | Babazadeh et al. | |
| 9,627,969 B2* | 4/2017 | Tschirhart | G01R 19/32 |
| 9,793,799 B1* | 10/2017 | Babazadeh | H02M 1/08 |
| 10,050,530 B2* | 8/2018 | Babazadeh | H02M 3/1588 |
| 2002/0021154 A1* | 2/2002 | Singor | G06F 1/08 |
| | | | 327/172 |

(Continued)

*Primary Examiner* — Gary L Laxton
*Assistant Examiner* — Demetries A Gibson
(74) *Attorney, Agent, or Firm* — Murphy, Bilak & Homiller, PLLC

(57) ABSTRACT

A voltage converter includes a power stage coupled to a power source, a passive circuit coupling the power stage to an output capacitor, a synchronous rectification (SR) switch operable to couple the passive circuit to ground when the SR switch is conducting, a linear controller and an adaptive voltage positioning (AVP) circuit. The linear controller is operable to control switching of the SR switch and switch devices included in the power stage, to regulate an output voltage of the voltage converter based on a reference voltage. The AVP circuit operable to generate an offset voltage applied to the reference voltage based on a first signal representing output current of the voltage converter, and to subtract a second signal from the first signal. The second signal approximates a surge current applied to the output capacitor via the passive circuit for charging the output capacitor during transitions in the reference voltage.

29 Claims, 9 Drawing Sheets

(56) References Cited

U.S. PATENT DOCUMENTS

| | | | |
|---|---|---|---|
| 2006/0152205 A1* | 7/2006 | Tang | H02M 3/1584 323/284 |
| 2006/0285366 A1* | 12/2006 | Radecker | H02M 3/33507 363/16 |
| 2007/0013355 A1* | 1/2007 | Liao | H02M 3/156 323/288 |
| 2011/0254526 A1* | 10/2011 | Luo | H02M 3/1584 323/284 |
| 2012/0249102 A1* | 10/2012 | Cuk | H02M 3/158 323/282 |
| 2013/0088894 A1* | 4/2013 | Rozman | G01R 31/40 363/15 |
| 2013/0234691 A1* | 9/2013 | Carroll | H02M 3/1588 323/283 |
| 2014/0247227 A1* | 9/2014 | Jiang | G06F 3/016 345/173 |
| 2016/0079851 A1 | 3/2016 | Babazadeh et al. | |
| 2017/0222560 A1* | 8/2017 | Babazadeh | H02M 3/33507 |

* cited by examiner

METHOD AND APPARATUS FOR DYNAMIC VOLTAGE TRANSITION CONTROL IN SEMI-RESONANT AND RESONANT CONVERTERS

TECHNICAL FIELD

The present application relates to semi-resonant and resonant converters and, in particular, relates to techniques for handling dynamic voltage transitions for such converters.

BACKGROUND

Resonant and semi-resonant DC-DC converters, including isolated and non-isolated topologies, are used in a variety of applications including telecommunications, consumer electronics, computer power supplies, etc. The usage of such converters is gaining popularity because of their zero-voltage switching (ZVS) and/or zero-current switching (ZCS) characteristics, and their ability to utilize parasitic electrical properties inherent in an electronic circuit. Among numerous topologies, the semi-resonant converter with transformer/tapped inductor is an attractive topology for providing high voltage-conversion ratios without requiring a high number of components. Such converters provide advantages including lower cost and higher efficiency as compared to other solutions.

One class of semi-resonant converters includes a power stage with high-side and low-side switches that transfer power from an input source to a tapped inductor that supplies output power to a load. The tapped inductor is also connected to a second low-side switch, which is termed a synchronous rectification (SR) switch herein. In order to meet the power requirements for a load of a semi-resonant converter (e.g., provide a near constant output voltage for the load), many semi-resonant DC-DC converters employ a variable switching frequency wherein the switching period can vary from cycle to cycle. During a portion of each switching period, the SR switch will be enabled such that current flows through it. For the semi-resonant converter described above, the current during this portion of a switching period will be shaped like one half cycle of a sinusoidal period.

Unlike other types of switching power converters, resonant and semi-resonant DC-DC converters such as the resonant tapped inductor converter can react to load changes much faster than the voltage/error changes. However, with high Q double poles at the switching frequency, the voltage loop of such a converter cannot be designed to have high enough bandwidth. Accordingly, the reaction of the converter to a dynamic transition in the load voltage is very slow with remarkable latency.

Dynamic transitions in the load voltage are typically handled by reshaping the target voltage and forcing the output voltage to move in a desired direction. However, such approaches may not result in an optimal transition response in some resonant and semi-resonant DC-DC converters. In addition to the loop bandwidth limitation issue, the shape of surge current needed to charge the output capacitor of the converter is different compared to other types of converters, so using an offset may not result in optimal surge current cancellation in AVP loop.

Accordingly, there is a need for improved dynamic voltage transition techniques for resonant or semi-resonant DC-DC converter that use synchronous rectification (SR) switches.

SUMMARY

According to an embodiment of a voltage converter, the voltage converter comprises a power stage coupled to a power source, a passive circuit coupling the power stage to an output capacitor, a synchronous rectification (SR) switch operable to couple the passive circuit to ground when the SR switch is conducting, a linear controller and an adaptive voltage positioning (AVP) circuit. The linear controller is operable to control switching of the SR switch and switch devices included in the power stage, to regulate an output voltage of the voltage converter based on a reference voltage. The AVP circuit is operable to generate an offset voltage applied to the reference voltage based on a first signal representing output current of the voltage converter, and to subtract a second signal from the first signal. The second signal approximates a surge current applied to the output capacitor via the passive circuit for charging the output capacitor during transitions in the reference voltage.

According to an embodiment of a method of operating a voltage converter that includes a power stage coupled to a power source, a passive circuit coupling the power stage to an output capacitor, and a synchronous rectification (SR) switch operable to couple the passive circuit to ground when the SR switch is conducting, the method comprises: controlling switching of the SR switch and switch devices included in the power stage to regulate an output voltage of the voltage converter based on a reference voltage; generating an offset voltage applied to the reference voltage based on a first signal representing output current of the voltage converter; and subtracting a second signal from the first signal, the second signal approximating a surge current applied to the output capacitor via the passive circuit for charging the output capacitor during transitions in the reference voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Embodiments described herein provide dynamic voltage transition control techniques for resonant or semi-resonant DC-DC converter that use synchronous rectification (SR) switches through which a half-cycle sinusoidal-like current is conducted when turned on. SR switches are included in a power converter topology having a transformer/tapped inductor (hereinafter referred to simply as a 'tapped inductor'), and are used for coupling the transformer/tapped inductor to ground. Such a topology allows for high voltage-conversion ratios without requiring isolation. Because of its ability to support high voltage-conversion ratios, this topology is particularly appropriate for applications requiring an output power supply that provides a relatively low voltage and a relatively high current. The techniques described below ensure an optimal transition response during dynamic transitions in the load voltage.

Various embodiments of single-phase and multi-phase voltage converter circuits and methods within single-phase and multi-phase voltage converters will be provided in the following detailed description and the associated figures. The described embodiments provide particular examples for purposes of explanation, and are not meant to be limiting. Features and aspects from the exemplary embodiments may be combined or re-arranged except where the context does not allow this.

Figure 1:
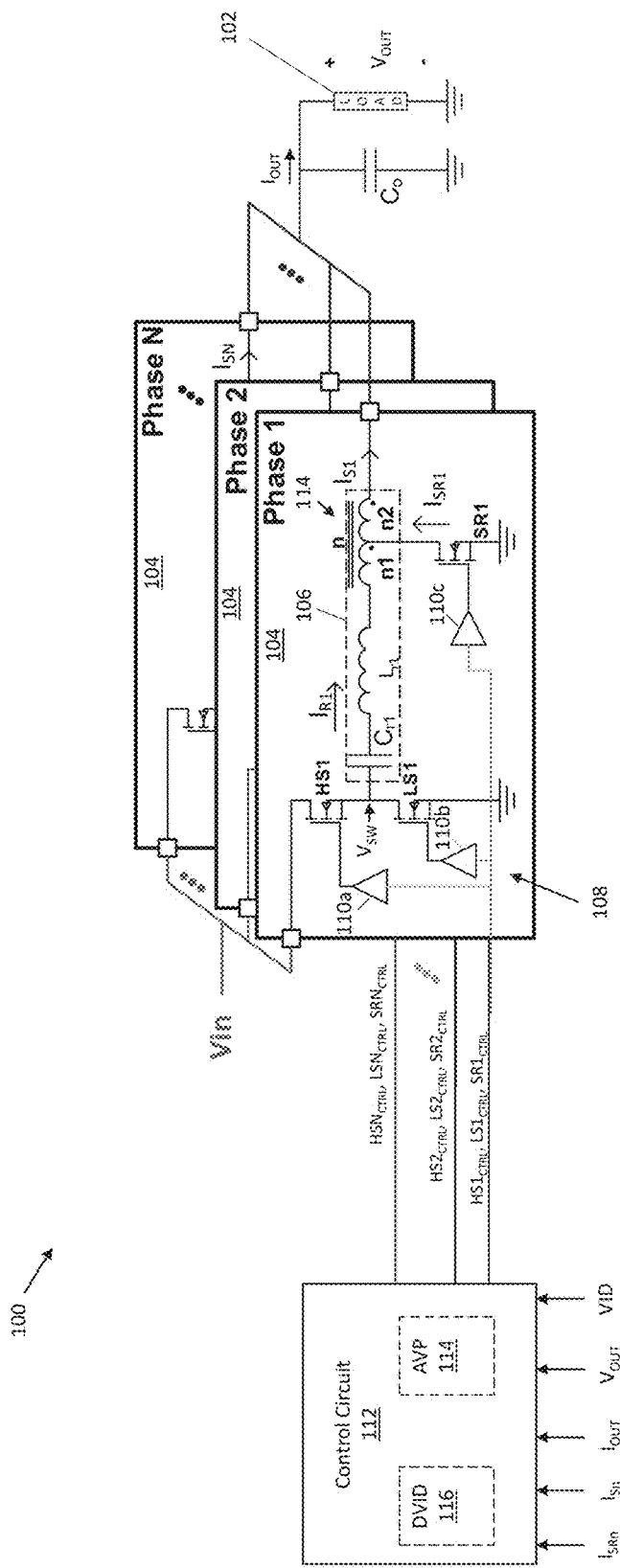
FIG. 1 illustrates a block diagram of an embodiment of a multi-phase voltage converter including a control circuit, wherein each phase includes a power stage, a passive circuit, and a synchronous rectification (SR) switch.

FIG. 1 illustrates an embodiment of a multi-phase voltage converter 100 operable to input power from a power source $V_{IN}$ and output power for driving a load 102. The voltage converter 100 supplies a current $I_{OUT}$ to the load 102 and for charging a capacitor $C_O$ that serves as a filter for the output voltage $V_{OUT}$. The voltage converter 100 of FIG. 1 includes multiple phases 104. Phase 1, which is taken as representative of the multiple phases, is illustrated in block diagram form with the understanding that the other phases would be similarly operable. Alternatively, the voltage converter 100 may instead include a single phase.

As illustrated, phase 1 includes a passive circuit 106 that couples a power stage 108 to the output capacitor $C_O$ of the voltage converter 100. The power stage 108 inputs switch control signals $HS1_{CTRL}$ and $LS1_{CTRL}$ for controlling high-side switch HS1 and low-side switch LS1 therein, respectively. The switches HS1, LS1 within the power stage 108 typically require drivers 110a, 110b. The passive circuit 106 is coupled to a synchronous rectification (SR) switch SR1, which serves to switchably couple the passive circuit 106 to ground. The SR switch SR1 also typically requires a driver 110c.

A control circuit 112 controls the switches HS1, LS1 of the power stage 108 and the SR switch SR1 for each phase 104 of the voltage converter 100. The control circuit 112 determines a switching period for the voltage converter 100 based upon the load requirements, and drives switch control signals (e.g., $HS1_{CTRL}$, $LS1_{CTRL}$, $SR1_{CTRL}$) for each phase 104 of the voltage converter 100. Control is applied to high-switch HS1 of the power stage 108. Low-side switch LS1 of the power stage 108 and the SR switch SR1 operate based on zero cross detection or a fixed off-time. This means that changing the on-time, which is applied to high-switch HS1, does not affect SR timing. The control signals generated by the control circuit 112 are typically pulse-width-modulated (PWM) waveforms, each of which is driven with a switching period and duty cycle determined by the control circuit 112 based upon the requirements of the load 102. The switching period (frequency) is variable and changes as the load requirements change.

The control circuit 112 may be implemented using analog hardware components (such as transistors, amplifiers, diodes, and resistors), may be implemented using processor circuitry including primarily digital components, or may be implemented using a combination of analog hardware components and processor circuitry. The processor circuitry may include one or more of a digital signal processor (DSP), a general-purpose processor, and an application-specific integrated circuit (ASIC). The control circuit 112 may also include memory, e.g., non-volatile memory such as flash, that includes instructions or data for use by processor circuitry. The control circuit 112 inputs several sensor signals e.g., $I_{OUT}$, $V_{OUT}$, current measurements for the SR switches of each phase 104, etc. to estimate the power requirements for the load 102 and to otherwise aid in the generation of the switch control signals.

In order to maintain stability and reduce ripple at the output of the voltage converter 100, the phases 104 of the voltage converter 100 are typically driven using the same switching period (frequency) during a switch cycle of the voltage converter 100. The control circuit 112 determines the load requirements at a given point in time. Based upon these load requirements and, possibly, the switching period for the current cycle, the control circuit 112 will determine a switching frequency (and associated time period) for an upcoming (next) cycle. For a given phase 104 of the voltage converter 100, this upcoming switch frequency (and associated time period) is used to generate the PWM waveforms for each of the switches in the given phase 104 (e.g., $HS1_{CTRL}$, $LS1_{CTRL}$, $SR1_{CTRL}$) for the upcoming switch cycle. Versions of these PWM waveforms that are delayed (staggered) in time are used to drive the switches in the other phases 104 of the voltage converter 100 for the upcoming switch cycle. The control circuit 112 repeats this process for each switching period. Techniques for determining the switching period (frequency) and duty cycles based upon the load requirements of a voltage converter are, generally, well-known in the art. Such conventional techniques will not be further elaborated upon herein, in order to avoid obfuscating the unique aspects of the invention, which are described.

Operation of phase 1 of the voltage converter 100 is described next in more detail. Input voltage $V_{IN}$ is input to the power converter 100 at high-side switch HS1 which is coupled to low-side switch LS1 at a switching node $V_{SW}$. Low-side switch LS1 is, in turn, connected to ground. Each of these switches HS1, LS1 is controlled by a respective driver 110a, 110b as shown. The switching node $V_{SW}$ is coupled to the passive circuit 106, which provides an output current $I_{S1}$ and voltage $V_{OUT}$ to the load 102. The passive circuit 106 includes a resonant tank comprised of a capacitor $C_{r1}$ and an inductor $L_{r1}$. The inductor $L_{r1}$ may merely be the leakage inductance (e.g., the inherent parasitic inductance of the circuit wiring), or it may be an actual inductor component together with the leakage inductance. Moreover, the inductance represented by $L_{r1}$ is typically variable, because the inductance value will often vary over temperature. The inductor $L_{r1}$ is coupled to a transformer/tapped inductor 114 having n1 primary-side windings and n2 secondary-side windings. The turns ratio n2/n1 determines the output/input voltage ratio of the transformer/tapped inductor 114 when it is conducting current. Conversely, the ratio n1/n2 determines the output/input current ratio of the transformer/tapped inductor 114. The SR switch SR1 is connected to the transformer/tapped inductor 114 and serves to couple its center tap to ground when the SR switch SR1 is conducting.

The high-side, low-side, and SR switches HS1, LS1, SR1 are shown in FIG. 1 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The high-side, low-side, and SR switches HS1, LS1, SR1 may be integrated on the same semiconductor die, may each be provided on separate dies, or may otherwise be spread across a plurality of semiconductor dies. The drivers 110a, 110b, 110c for the high-side, low-side, and SR switches HS1, LS1, SR1 may be integrated on the same semiconductor die(s) as their corresponding switches, or may be provided on separate dies.

The control circuit 112 generates PWM signals $HS1_{CTRL}$, $LS1_{CTRL}$, and $SR1_{CTRL}$ that are coupled to the respective drivers 110a, 110b, 110c that control high-side, low-side, and SR switches HS1, LS1, SR1 for the illustrated phase 104. The control circuit 112 determines the switching period (frequency) and duty cycle of the PWM signals $HS1_{CTRL}$, $LS1_{CTRL}$, and $SR1_{CTRL}$, so as to meet the power requirements of the load 102. In a semi-resonant voltage converter such as that illustrated in FIG. 1, the high-side and low-side switches HS1, LS1 of the power stage 108 are controlled such that these switches do not conduct at the same time. A typical switching cycle of the voltage converter phase 104 begins with a "dead time" during which none of the switches HS1, LS1, SR1 are conducting. This is followed by an on-time period "$T_{ON}$" during which the high-side switch HS1 is conducting, but the low-side switch LS1 and the SR switch SR1 are not conducting. An off-time period "$T_{OFF}$" follows $T_{ON}$ in the same switching period, during which the high-side switch $Q_{HS}$ HS1 not conducting, but the low-side switch LS1 and the SR switch SR1 are conducting.

Figure 2:
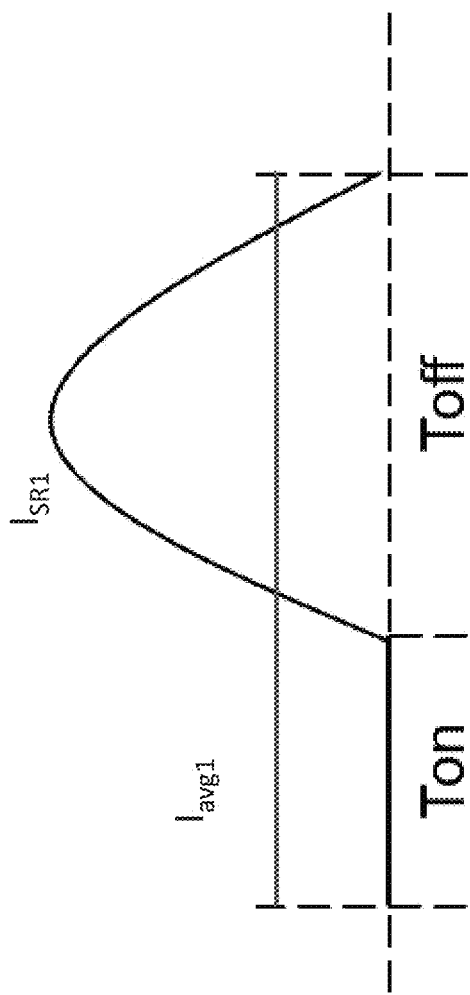
FIG. 2 illustrates a functional diagram of the half-cycle sinusoidal-like current through the SR switch in FIG. 1.

FIG. 2 illustrates the current through SR switch SR1 when turned on. The DC average $I_{avg1}$ of the SR1 switch current $I_{SR1}$ is also shown in FIG. 2. For the sake of simplicity, tristate time is not shown in FIG. 2 when all switches HS1, LS1, SR1 are not conducting. For best efficiency, SR switch SR1 should be switched off when $I_{SR1}$ crosses zero i.e. zero current switching. The control circuit 112 can sense either the output current $I_{S1}$ of the phase 104 or the current $I_{SR1}$ through SR switch SR1 to determine the zero crossing instant. The control circuit 112 controls the on-time $T_{ON}$ to regulate the output voltage Vout as given by:

$$V_{OUT}=V_{IN}*D/n \quad (1)$$

where D is the duty cycle and n=(n1+n2)/n2 is the turns ratio of the transformer/tapped inductor 114. The off-time $T_{OFF}$, for best efficiency, is based on the resonant capacitor $C_{r1}$ and inductor $L_{r1}$.

For a given phase, 104 current flows through its SR switch, e.g., SR1, when the SR switch is conducting. The PWM control signal $SR1_{CTRL}$ for SR switch SR1 determines when that SR switch conducts. The PWM control signal $SR1_{CTRL}$ only enables corresponding SR switch SR1 during the off interval ("$T_{OFF}$") of the high-side switch HS1 for the phase 104. In FIG. 2, this corresponds to the time interval when the high-side control signal $HS1_{CTRL}$ is low.

The currents flowing through the SR switches SR1, SR2, SRN take on the shape of the upper (positive) half cycle of a sinusoid. This is readily seen in FIG. 2 for the current $I_{SR1}$ that flows through SR switch SR1 for phase 1 of the voltage converter 100. For each cycle (e.g., k−1, k), the half-cycle sinusoidal-like current returns to zero at the beginning of the dead-time interval that immediately precedes the rising edge of the high-side PWM control signal $HS1_{CTRL}$. The rising edge of the high-side PWM control signal $HS1_{CTRL}$ signifies the start of the next cycle (e.g., k, k+1) of the voltage converter 100. Again, for ease of illustration, the "dead time" is not shown in FIG. 2, but it is understood that the PWM control signal $SR1_{CTRL}$ would actually disable the current $I_{SR1}$ at the start of a dead time interval during which none of the switches are conducting.

The control circuit 112 of the voltage converter 100 adjusts the PWM signal timings, e.g., $HS1_{CTRL}$, $LS1_{CTRL}$, $SR1_{CTRL}$, so that the SR switch SR1 of phase 1 is turned off at approximately the time when the current $I_{SR1}$ flowing through SR switch SR1 is zero. The control circuit 112 may determine these timings using a measurement/estimation of the current $I_{SR1}$ as input to a current sampler included in or associated with the control circuit 112. For example, the current $I_{SR1}$ may be measured by using the effective on-state resistance ($R_{dson}$) of SR switch SR1 and the voltage across SR switch SR1, or by using a current mirror. The current measurement, for $I_{SR1}$ or otherwise, may also be accomplished by using other standard means such as measuring the voltage across a sensing resistor, or by using direct current sensing (DCR) techniques.

In addition to controlling the switching of the SR switch and switch devices HS, LS included in the power stage 108 of each phase 104 during steady-state operation i.e. when there is no change in the reference voltage VID, the control circuit 112 also responds to dynamic transitions in the reference voltage VID. To this end, the voltage converter 100 includes an adaptive voltage positioning (AVP) circuit 114 and a dynamic voltage transition (DVID) control circuit 116 included in or associated with the control circuit 112.

Figure 3:
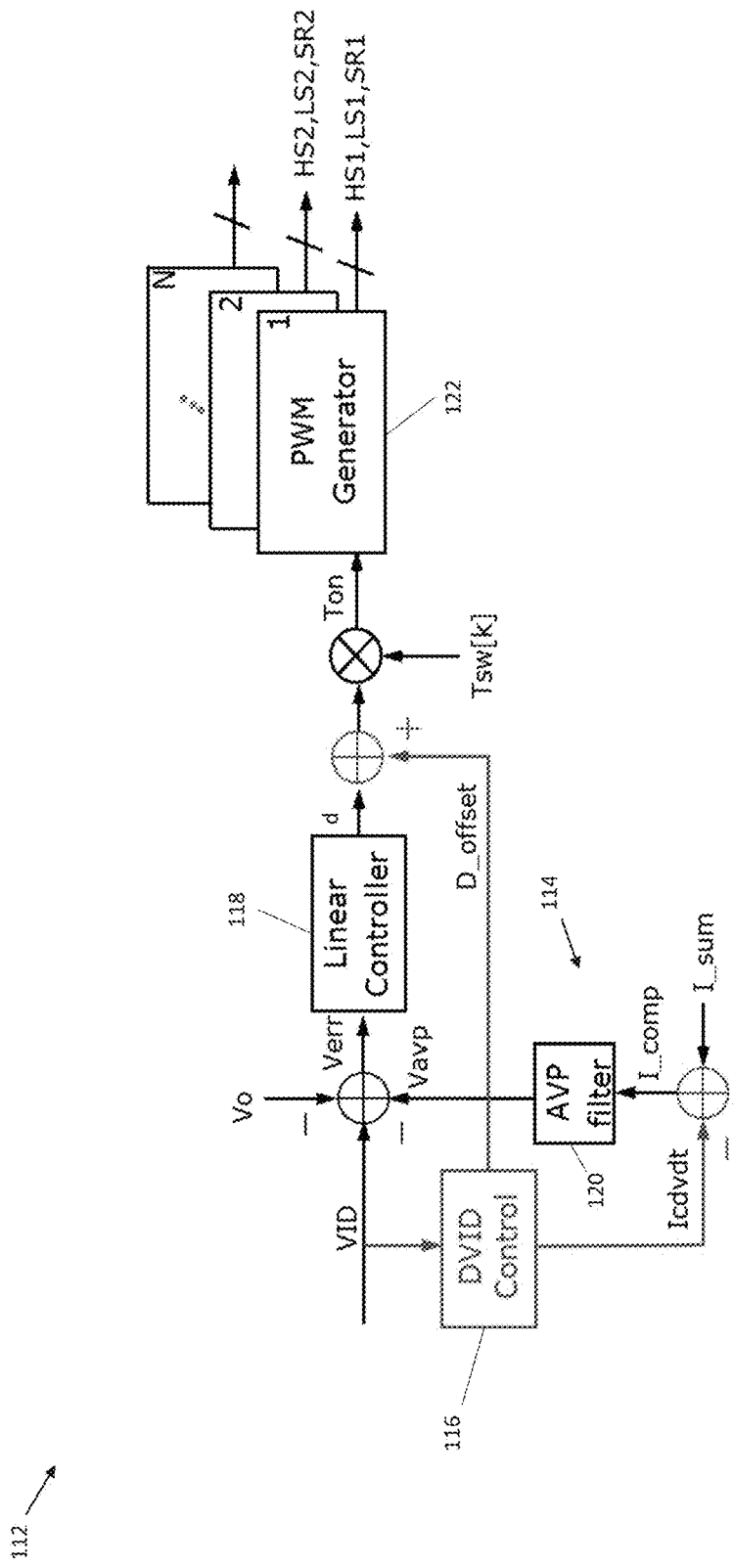
FIG. 3 illustrates an embodiment of a block diagram of the control circuit included in the multi-phase voltage converter of FIG. 1.

FIG. 3 illustrates the control circuit 112, AVP circuit 114 and DVID control circuit 116 in more detail. During steady-state operation, a linear controller 118 included in or associated with the control circuit 112 controls switching of the SR switch and switches HS, LS included in the power stage 108 of each phase 104 to regulate the output voltage Vout of the voltage converter 100 based on the reference voltage VID. The AVP circuit 114 adjusts the output voltage Vout according to the sensed output current I_sum. In the case of a multi-phase converter, I_sum is the sum of all phase currents. In the case of a single-phase converter, I_sum is the output current of the single phase. In either case, the AVP circuit 114 includes a filter 120 such as a low pass filter for filtering I_sum to generate an offset voltage Vavp. The control circuit 112 subtracts the offset voltage Vavp and the output voltage Vout from the reference voltage VID to generate an error signal Verr input to the linear controller 118. The linear controller 118 generates a duty cycle 'd' for use in switching the SR switch and the switches HS, LS included in the power stage 108 of each phase 104. The duty cycle 'd' is multiplied by the switching period Tsw[k] to generate the on-time Ton for the high-side switch HS of each phase 104. The on-time determines how long the high-side switch HS of each phase 104 is on (conducting) and how long the low-side switch LS and synchronous rectification SR of each phase 104 are off (not conducting) during each switching cycle. A PWM generator 122 for each phase 104 generates the corresponding switch control signals HSn, LSn, SRn based on the on-time Ton as is well known in the art.

During a dynamic transition in the reference voltage VID, the slew rate of the voltage ramp determines how quickly the new target voltage can be reached by the voltage converter 100. However, the surge current Cdv/dt for charging the output capacitor $C_O$ during the transition in VID has inherent delay due to a low bandwidth of the control loop. Also, the AVP circuit 114 includes a low pass filter 120 for filtering the surge current Cdv/dt adds to the delay in the surge current Cdv/dt. The delay in the surge current Cdv/dt causes the linear controller 118, e.g. a PID (proportional-integral-derivative controller) controller, to follow a less than ideal ramp unless the delay is mitigated. Furthermore, the surge current Cdv/dt for charging the output capacitor $C_O$ adversely effects the error voltage Verr input to the linear controller 118 unless the surge current contribution is removed from the AVP loop. Moreover, the inductors $L_{r1}$ limit the surge current Cdv/dt, causing the surge current Cdv/dt to have a non-ideal waveform, making it more difficult to remove Cdv/dt from the AVP loop.

Figure 4:
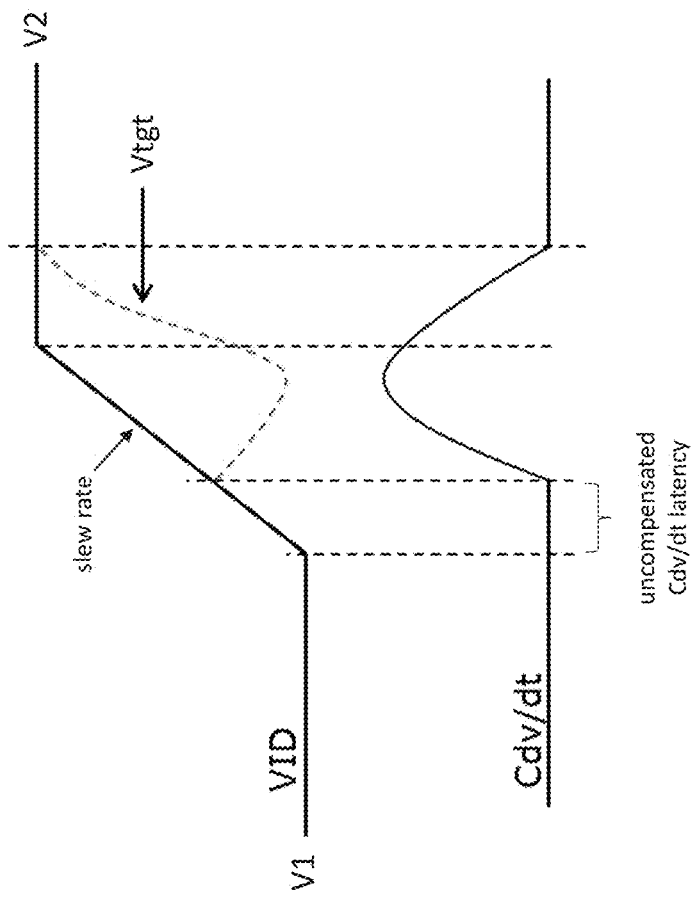
FIG. 4 illustrates a waveform diagram of a voltage transition and corresponding surge current for a semi-resonant or resonant voltage converter.

FIG. 4 illustrates a transition in the reference voltage VID from a first voltage level V1 to a second voltage level V2 which is greater than V1, and a waveform representation of the corresponding surge current Cdv/dt applied to the output capacitor $C_O$ via the passive circuit 106 during the transition in the reference voltage VID. The surge current Cdv/dt charges the output capacitor $C_O$ during the transition from V1 to V2. In response to the error voltage Verr input to the linear controller 118, the linear controller 118 reshapes the reference voltage VID to a target voltage Vtgt and forces the output voltage Vout to move in a desired direction. However, without adequate Cdv/dt compensation, the target voltage Vtgt has an undesirable waveform as shown in FIG. 4 due to the non-ideal envelope of the surge current Cdv/dt. This in turn causes the output voltage Vout of the converter 100 to respond in a less than ideal manner. FIG. 4 also shows the uncompensated latency (delay) in the surge current Cdv/dt due to the slow response of the linear controller 118.

Figure 5:
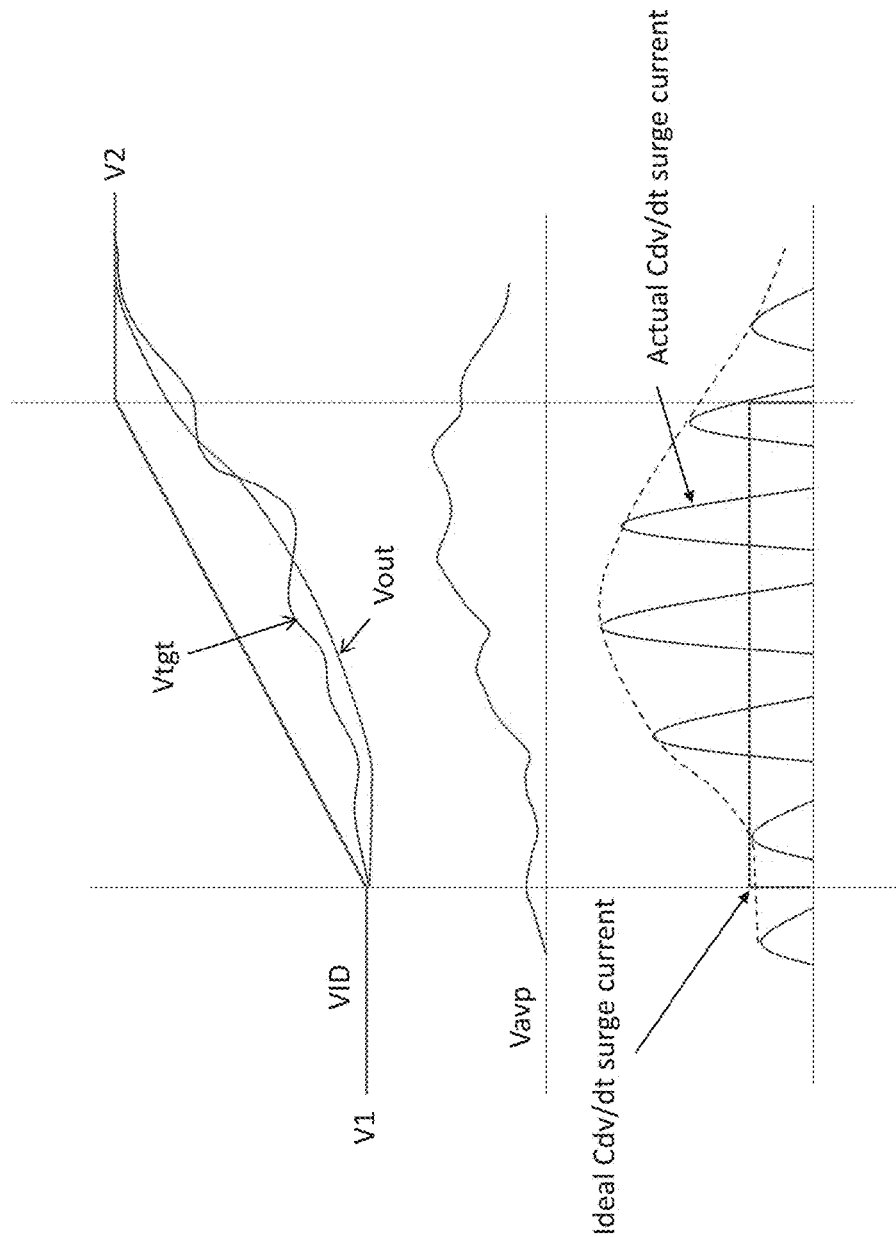
FIG. 5 illustrates a waveform diagram of a voltage transition and corresponding surge current for a single-phase semi-resonant or resonant voltage converter.
Figure 6:
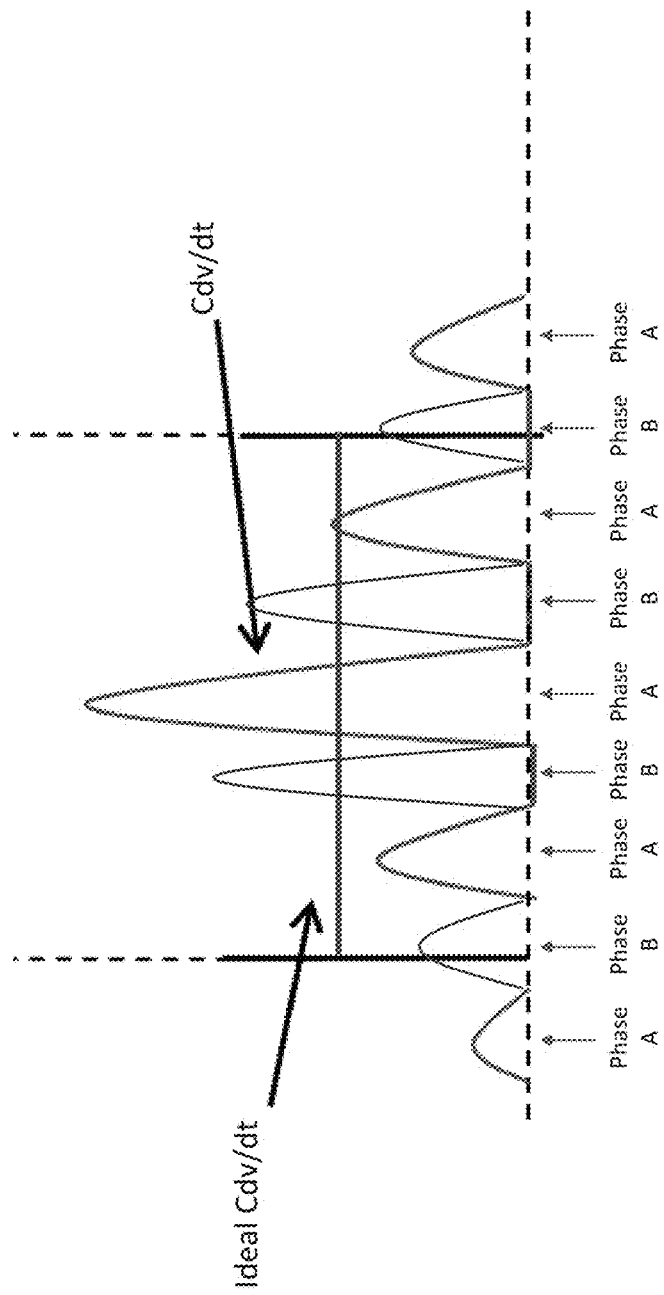
FIG. 6 illustrates a waveform diagram of a surge current for a multi-phase semi-resonant or resonant voltage converter.

FIG. 5 illustrates the actual surge current Cdv/dt applied to the output capacitor $C_O$ via the passive circuit 106 for charging the output capacitor $C_O$ during the voltage transition in the reference voltage VID from voltage level V1 to voltage level V2 as compared to the ideal surge current waveform, for a single-phase converter. FIG. 6 shows the corresponding waveform for a multi-phase converter.

Because the surge current Cdv/dt is input to the AVP filter 120 as I_sum during transitions in the reference voltage VID, the AVP circuit 114 cancels all or essentially all of the surge current Cdv/dt from the current compensation signal I_comp input to the AVP filter 120 so as to remove the surge current contribution from the offset voltage Vavp output by the AVP filter 120. Otherwise, the error voltage Verr will have a suboptimal waveform which will adversely affect the target voltage Vtgt and hence the transition in the output voltage Vout. The ideal surge current has a square waveform as indicated in FIGS. 5 and 6, which is relatively easy to compensate for. However, due to the resonant or semi-resonant nature of the converter 100, the envelope of the surge current Cdv/dt approximates a half-cycle sinusoidal-like waveform as indicated by the curvilinear dashed line in FIG. 5.

The AVP circuit 114 removes most or all of the surge current Cdv/dt contribution from the AVP loop during transitions in the reference voltage VID. More particularly, the AVP circuit 114 generates the offset voltage Vavp based on I_sum which represents the output current of the voltage converter 100, and subtracts a second signal Icdvdt from I_sum prior to filtering. The second signal Icdvdt is designed to approximate the surge current Cdv/dt applied to the output capacitor $C_O$ via the passive circuit 106 for charging the output capacitor $C_O$ during transitions in the reference voltage VID. This way, most or all of the Cdv/dt contribution is removed from I_comp before I_comp is input to the AVP filter 120.

Figure 7:
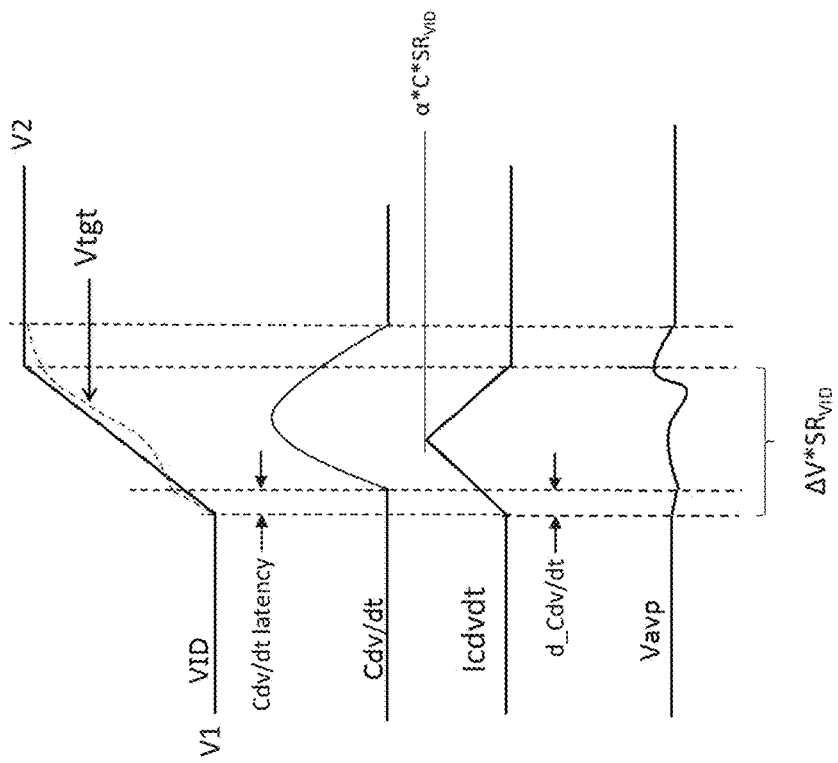
FIG. 7 illustrates a waveform diagram of a voltage transition, surge current and surge current compensation signal for a semi-resonant or resonant voltage converter.

FIG. 7 illustrates one embodiment in which the second signal Icdvdt has a triangular waveform to approximate the surge current Cdv/dt. In another embodiment, the second signal Icdvdt has a half-cycle sinusoidal-like waveform to approximate the surge current Cdv/dt. The linear controller 118 can generate the second signal Icdvdt based on the expected peak of the surge current Cdv/dt and the magnitude of change ΔV (V2-V1) in the reference voltage VID. In the case of a digital linear controller, the controller 118 can readily implement any desired waveform for the second signal Icdvdt. The expected peak of the surge current Cdv/dt is known or can be calculated as given by:

$$\alpha * C * SR_{VID} \quad (1)$$

where C is the capacitance of the output capacitor $C_O$, $SR_{VID}$ is the slew rate of the converter 100, and α is a scaling factor. The total time of the voltage transition from V1 to V2 also is known, or can be calculated as given by:

$$\Delta V * SR_{VID} \quad (2)$$

The linear controller 118 can apply the Cdv/dt compensation at the beginning of the dynamic transition in the reference voltage VID, which may cause the second signal Icdvdt to lead the surge current Cdv/dt if Cdv/dt has uncompensated latency as previously described herein and illustrated in FIG. 7 as 'Cdv/dt latency'. Alternatively, the linear controller 118 can delay the second signal Icdvdt by d_Cdv/dt to better align the second signal Icdvdt with the surge current Cdv/dt in the case of uncompensated latency.

Returning to FIG. 4, the DVID control circuit 116 can compensate the inherent latency ('Cdv/dt latency' in FIG. 7) in the surge current Cdv/dt by applying an offset D_offset to the duty cycle 'd' generated by the linear controller 118 or the on-time Ton generated from the duty cycle. As previously described herein, the linear controller 118 generates the duty cycle 'd' for use in switching the SR switch and the switches HS, LS included in the power stage 108 of each phase 104 of the converter 100 during both steady-state operation and during transitions in the reference voltage VID. The offset D_offset applied directly to the duty cycle 'd' or on-time Ton forces the output voltage Vout to transition earlier from V1 to V2 even though the control loop gain/response is slow. For example, the duty cycle 'd' calculated by the linear controller 118 may be 40% and D_offset may increase 'd' to 50% or 60%. As a result of D_offset, the control loop error is smaller and the latency of the surge current Cdv/dt is reduced. In a purely illustrative example, the latency of the surge current Cdv/dt may be reduced from approximately 1.7 us or more to approximately 0.6 us or less. Other ranges of delay/latency reduction for the surge current Cdv/dt are contemplated and within the scope of the related embodiments described herein. In the case of a PID-based controller, the integrator of the PID controller accumulates significant error during transitions in the reference voltage VID, but moves faster with the aid of D_offset because the surge current Cdv/dt moves faster.

The linear controller 118 can accommodate a plurality of different magnitudes of change in the reference voltage VID, and the offset D_offset applied to the duty cycle 'd' or on-time Ton by the DVID control circuit 116 can depend on the magnitude of change in the reference voltage VID. In one embodiment, the linear controller 118 or the DVID control circuit 116 stores a set of pre-programmed values for D_offset based on different VID transition options. The set of pre-programmed D_offset values can be determined based on various considerations such as voltage transition magnitude (delta), slew rate of the converter 100, capacitance of the output capacitor $C_O$, etc. Since the slew rate of the converter 100 is fixed and known, the linear controller 118 is not required to calculate the shape and timing of the offset D_offset applied to the duty cycle 'd' or on-time Ton to reduce the latency in the surge current Cdv/dt. Instead, the shape and timing of each D_offset value can be stored in the control circuit 112 and accessed as a function of the magnitude of change in the reference voltage VID.

The offset D_offset provided by the DVID control circuit 116 can be applied for a short time or during the entire transition in the reference voltage VID. The offset D_offset can be a single fixed value used for all transitions in the reference voltage VID, or can be based on the magnitude of each supported transition in the reference voltage VID as explained above.

The offset D_offset applied to the duty cycle 'd' or on-time Ton by the DVID control circuit 116 can be determined based on the capacitance of the output capacitor $C_O$ and slew rate $SR_{VID}$ of the voltage converter 100. For example, if the capacitance of the output capacitor $C_O$ is high, more D_offset compensation is needed to reduce the latency in the surge current Cdv/dt. If the slew rate of the converter 100 is high, more D_offset compensation is needed to reduce the latency in the surge current Cdv/dt. The control circuit 112 can determine the amplitude and timing of D_offset applied to the duty cycle or on-time based on the slew rate $SR_{VID}$ of the voltage converter 100 and the magnitude of change in the reference voltage VID, both quantities being known to the control circuit 112.

Figure 8:
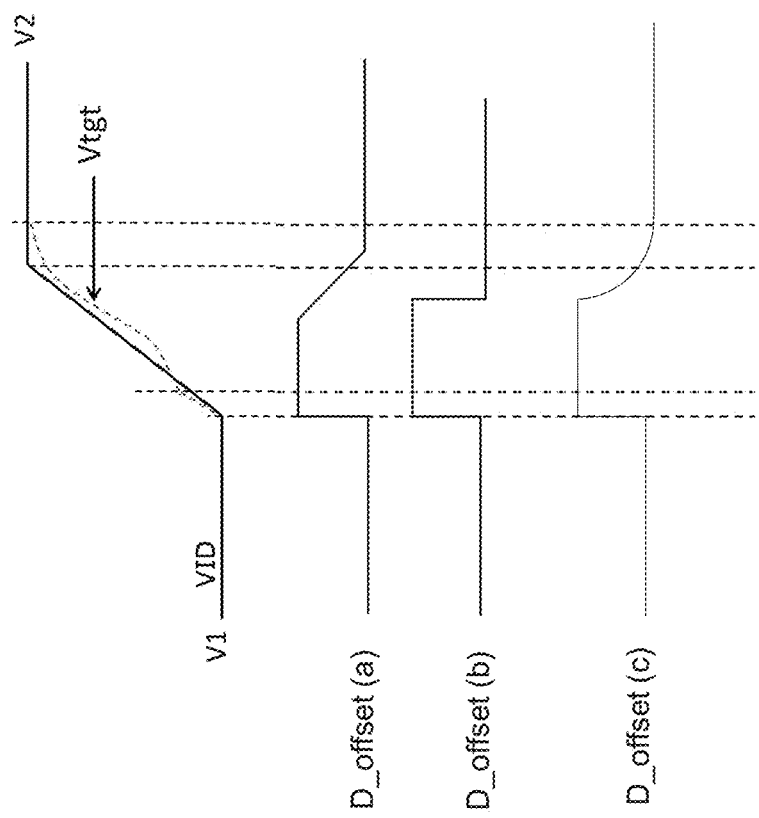
FIG. 8 illustrates a waveform diagram of a voltage transition and various delay compensation signals for a semi-resonant or resonant voltage converter.

FIG. 8 illustrates different embodiments of the offset D_offset applied to the duty cycle 'd' or on-time Ton by the DVID control circuit 116. In each embodiment, the rising edge of D_offset is steeper than the falling edge of D_offset. The rising edge of D_offset is more critical in reducing the latency of the surge current Cdv/dt. The falling edge of D_offset is less critical in this regard, and can have different shapes as shown in FIG. 8. In embodiment (a), the falling edge of D_offset declines at a constant rate. In embodiment (b), the rising and falling edges of D_offset are the same and D_offset has a square waveform. In embodiment (c), the falling edge of D_offset has an exponential decay. In each case, the linear controller 118 can determine the amplitude and timing of D_offset applied to the duty cycle 'd' or on-time Ton based on the slew rate $SR_{VID}$ of the voltage converter 100 and magnitude of the change (ΔV) in the reference voltage VID since these quantities are known and define the voltage transition.

Figure 9:
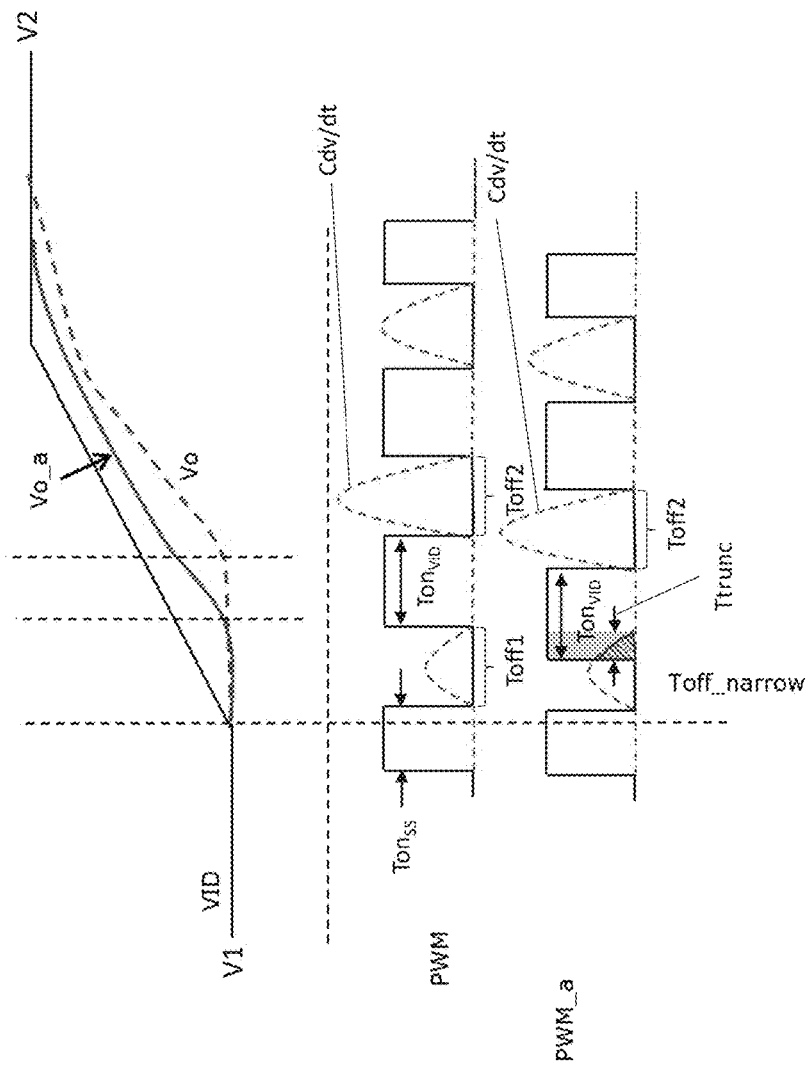
FIG. 9 illustrates a waveform diagram of a voltage transition and alternative PWM control signals for a semi-resonant or resonant voltage converter.

FIG. 9 illustrates a PWM control embodiment implemented by the control circuit 112 in response to a transition in the reference voltage VID from voltage level V1 to voltage level V2. Just prior to the transition in the reference voltage VID, the PWM pulse generated by the control circuit 112 and applied to the high-side switch HS included in the power stage 108 of each phase 104 of the converter 100 has a width $Ton_{SS}$. The control circuit 112 determines the steady-state PWM pulse width $Ton_{SS}$ so as to regulate the output voltage of the converter 100 to the present voltage level V1. The control circuit 112 increases the pulse width to $Ton_{VID}$ during the transition in the reference voltage VID from V1 to V2 so as to yield a larger surge current Cdv/dt for charging the output capacitor $C_O$, allowing the converter 100 to more quickly increase the output voltage Vout to the new voltage level V2. The energy transferred during each off-time relates to the pulse width of the immediately preceding on-time, because energy is transferred to the output capacitor $C_O$ during off-times in which the high-side switch device HS is off and the low-side switch device LS and synchronous rectification switch SR of the corresponding phase 104 are on. Accordingly, the first off-time Toff1 during the transition in the reference voltage VID has less current than the subsequent off-time Toff2.

In one embodiment, the linear controller 118 shortens the off-time duration Toff1 at the beginning of the transition in VID by an amount 'Trunc' so that the subsequent on-time $Ton_{VID}$ which has a longer duration than $Ton_{SS}$ occurs sooner in the transition in the reference voltage VID. This way, the actual off-time Toff_narrow at the beginning of the transition in VID is shorter than it would have been as illustrated by comparing signal 'PWM_a' to signal 'PWM' in FIG. 9. By shortening the first off-time duration at the beginning of the transition in VID from Toff1 to Toff_narrow, the larger Cdv/dt surge current is pulled in earlier and the output capacitor $C_O$ charges faster. Shortening the off-time duration Toff1 at the beginning of the transition in VID by Trunc does reduce the first Cdv/dt surge current during the VID transition by an amount represented by the cross-hatched part of the first Cdv/dt surge current shown for signal 'PWM_a' in FIG. 9. In FIG. 9, 'Trunc' represents the amount of time by which the off-time duration Toff1 at the beginning of the transition in VID is shortened. Accordingly, the subsequent on-time $Ton_{VID}$ occurs Trunc earlier than it otherwise would have in the signal labeled 'PWM' in FIG. 9 and the larger surge current Cdv/dt is pulled in by Trunc. With this approach, a small amount of the first surge current is sacrificed at the beginning of the transition in VID from V1 to V2 to move in the larger surge current Cdv/dt which occurs later in the voltage transition. However, the first surge current Cdv/dt at the beginning in the VID transition is relatively small compared to the later surge current and therefore only a small amount of output capacitor charging current is lost at the beginning of the VID transition. Preferably, the first off-time Toff1 is truncated sometime after the peak in the surge current Cdv/dt occurs as shown in FIG. 9 ('Trunc' occurs after the peak in Cdv/dt for Toff_narrow).

The off-time shortening can be a one-time occurrence at the beginning of the voltage transition event. However, the linear controller 118 can shorten the off-time for the first or few first switching cycles to allow the PID to catch up. Accordingly, the linear controller 118 may shorten the off-time duration for a plurality of switching periods at the beginning of the voltage transition in VID. In each case, the output voltage Vout of the converter 100 has a transition that more closely mimics the ideal transition in the reference voltage VID from voltage level V1 to voltage level V2 by shortening at least the first off-time during the voltage transition. This effect is illustrated in FIG. 9, by comparing the output voltage Vo for signal 'PWM' without off-time shortening to the output voltage Vo_a for signal 'PWM_a' with off-time shortening.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:
a power stage coupled to a power source;
a passive circuit coupling the power stage to an output capacitor;
a synchronous rectification (SR) switch operable to couple the passive circuit to ground when the SR switch is conducting;
a linear controller operable to control switching of the SR switch and switch devices included in the power stage, to regulate an output voltage of the voltage converter based on a reference voltage; and
an adaptive voltage positioning (AVP) circuit operable to generate an offset voltage applied to the reference voltage based on a first signal representing output current of the voltage converter, and to subtract a second signal from the first signal, the second signal approximating a surge current applied to the output capacitor via the passive circuit for charging the output capacitor during transitions in the reference voltage.

2. The voltage converter of claim 1, wherein the second signal has a half-cycle sinusoidal-like waveform.

3. The voltage converter of claim 1, wherein the second signal has a triangular waveform.

4. The voltage converter of claim 1, wherein the linear controller is operable to generate the second signal based on an expected peak of the surge current and a magnitude of change in the reference voltage.

5. The voltage converter of claim 1, wherein the AVP circuit is operable to generate a current compensation signal based on a difference between the first signal and the second signal, filter the current compensation signal to generate the offset voltage and subtract the offset voltage and an output voltage feedback signal from the reference voltage to generate an error signal input to the linear controller.

6. The voltage converter of claim 1, wherein the linear controller is operable to generate a duty cycle for use in switching the SR switch and the switch devices included in the power stage, wherein an offset is applied to the duty cycle or on-time generated from the duty cycle, and wherein the offset increases the duty cycle or the on-time.

7. The voltage converter of claim 6, wherein the offset applied to the duty cycle or the on-time is fixed.

8. The voltage converter of claim 6, wherein the linear controller is operable to accommodate a plurality of different degrees of change in the reference voltage, and wherein the offset applied to the duty cycle or the on-time depends on the degree of change in the reference voltage.

9. The voltage converter of claim 6, wherein a rising edge of the offset applied to the duty cycle or the on-time is steeper than a falling edge of the offset.

10. The voltage converter of claim 6, wherein the linear controller is operable to control an amplitude and timing of the offset applied to the duty cycle or the on-time based on a slew rate of the voltage converter and a magnitude of change in the reference voltage.

11. The voltage converter of claim 6, wherein the offset applied to the duty cycle or the on-time is based on the output capacitor and a slew rate of the voltage converter.

12. The voltage converter of claim 1, wherein during a transition in the reference voltage from a first voltage level to a second voltage level the linear controller is operable to shorten an off-time duration at a beginning of the transition and during which energy is transferred to the output capacitor via the passive circuit, so that a subsequent on-time of longer duration than the off-time occurs sooner in the transition in the reference voltage.

13. The voltage converter of claim 12, wherein the linear controller is operable to shorten the off-time duration for a plurality of switching periods at the beginning of the transition.

14. The voltage converter of claim 1, wherein the passive circuit is configured such that a current flowing through the SR switch when the SR switch is conducting has a shape of a half cycle of a sinusoid, and the surge current applied to the output capacitor comprises half cycle sinusoids.

15. The voltage converter of claim 1, wherein the passive circuit comprises a tapped inductor and the SR switch is operable to couple a center tap of the tapped inductor to ground when the SR switch is conducting.

16. The voltage converter of claim 1, wherein the power stage comprises a high-side switch and a low-side switch, and wherein the linear controller is operable to control the SR switch such that the SR switch conducts when the low-side switch is conducting, and the SR switch does not conduct when the low-side switch is not conducting.

17. A method of operating a voltage converter that includes a power stage coupled to a power source, a passive circuit coupling the power stage to an output capacitor, and a synchronous rectification (SR) switch operable to couple the passive circuit to ground when the SR switch is conducting, the method comprising:
controlling, using a linear control technique, switching of the SR switch and switch devices included in the power stage to regulate an output voltage of the voltage converter based on a reference voltage;
generating an offset voltage applied to the reference voltage based on a first signal representing output current of the voltage converter; and
subtracting a second signal from the first signal, the second signal approximating a surge current applied to the output capacitor via the passive circuit for charging the output capacitor during transitions in the reference voltage.

18. The method of claim 17, wherein the second signal has a half-cycle sinusoidal-like waveform.

19. The method of claim 17, wherein the second signal has a triangular waveform.

20. The method of claim 17, further comprising:
generating the second signal based on an expected peak of the surge current and a magnitude of change in the reference voltage.

21. The method of claim 17, further comprising:
generating a current compensation signal based on a difference between the first signal and the second signal;
filtering the current compensation signal to generate the offset voltage; and
subtracting the offset voltage and an output voltage feedback signal from the reference voltage to generate an error signal input to a linear controller of the voltage converter.

22. The method of claim 17, further comprising:
generating a duty cycle for use in switching the SR switch and the switch devices included in the power stage; and
applying an offset to the duty cycle or on-time generated from the duty cycle, the offset increasing the duty cycle or the on-time.

23. The method of claim 22, wherein the offset applied to the duty cycle or the on-time is fixed.

24. The method of claim 22, further comprising:
accommodating a plurality of different degrees of change in the reference voltage,
wherein the offset applied to the duty cycle or the on-time depends on the degree of change in the reference voltage.

25. The method of claim 22, wherein a rising edge of the offset applied to the duty cycle or the on-time is steeper than a falling edge of the offset.

26. The method of claim 22, further comprising:
controlling an amplitude and timing of the offset applied to the duty cycle or the on-time based on a slew rate of the voltage converter and a magnitude of change in the reference voltage.

27. The method of claim 22, wherein the offset applied to the duty cycle or the on-time is based on the output capacitor and a slew rate of the voltage converter.

28. The method of claim 17, further comprising:
during a transition in the reference voltage from a first voltage level to a second voltage level, shortening an off-time duration at a beginning of the transition and during which energy is transferred to the output capacitor via the passive circuit, so that a subsequent on-time of longer duration than the off-time occurs sooner in the transition in the reference voltage.

29. The method of claim 28, further comprising:
shortening the off-time duration for a plurality of switching periods at the beginning of the transition.

* * * * *